(12) United States Patent
Lee et al.

(10) Patent No.: US 9,330,489 B2
(45) Date of Patent: May 3, 2016

(54) MOBILE APPARATUS DISPLAYING A 3D IMAGE COMPRISING A PLURALITY OF LAYERS AND DISPLAY METHOD THEREOF

(75) Inventors: Yeon-hee Lee, Seoul (KR); Jung-hyun Shim, Gyeonggi-do (KR); Yong-yeon Lee, Gyeonggi-do (KR); Ja-ok Koo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 435 days.

(21) Appl. No.: 13/114,484

(22) Filed: May 24, 2011

(65) Prior Publication Data

US 2012/0194507 A1  Aug. 2, 2012

(30) Foreign Application Priority Data

Jan. 27, 2011  (KR) ........................ 10-2011-0008383

(51) Int. Cl.
| G09G 5/00 | (2006.01) |
| G06T 15/20 | (2011.01) |
| G06F 1/16 | (2006.01) |
| G06F 3/0481 | (2013.01) |
| G06F 3/0483 | (2013.01) |
| G09G 3/00 | (2006.01) |

(52) U.S. Cl.
CPC .............. *G06T 15/20* (2013.01); *G06F 1/1694* (2013.01); *G06F 3/0483* (2013.01); *G06F 3/04815* (2013.01); *G06F 2200/1637* (2013.01); *G09G 3/003* (2013.01)

(58) Field of Classification Search
USPC ....................................................... 345/629
See application file for complete search history.

(56) References Cited

U.S. PATENT DOCUMENTS

| 6,909,443 | B1 | 6/2005 | Robertson et al. | |
| 6,914,618 | B2* | 7/2005 | Weiss | 345/649 |
| 7,007,242 | B2* | 2/2006 | Suomela et al. | 715/849 |
| 7,446,766 | B2* | 11/2008 | Moravec | 345/424 |
| 7,512,902 | B2 | 3/2009 | Robertson et al. | |
| 7,694,237 | B2* | 4/2010 | Pusa et al. | 715/841 |
| 8,423,076 | B2* | 4/2013 | Kim et al. | 455/550.1 |
| 2005/0010876 | A1* | 1/2005 | Robertson et al. | 715/782 |
| 2005/0212757 | A1* | 9/2005 | Marvit et al. | 345/156 |
| 2006/0017692 | A1* | 1/2006 | Wehrenberg et al. | 345/156 |
| 2006/0161861 | A1* | 7/2006 | Holecek et al. | 715/782 |
| 2006/0253791 | A1* | 11/2006 | Kuiken et al. | 715/766 |

(Continued)

FOREIGN PATENT DOCUMENTS

| CN | 101754036 | 6/2010 |
| KR | 1020110002656 | 1/2011 |

OTHER PUBLICATIONS

Australian Examination Report dated Sep. 14, 2015 issued in counterpart application No. 2012209590, 3 pages.

(Continued)

*Primary Examiner* — Ryan R Yang
(74) *Attorney, Agent, or Firm* — The Farrell Law Firm, P.C.

(57) ABSTRACT

A mobile apparatus is provided including a display unit which displays layers in different depth degrees from each other and displays a plurality of layers which are arranged in a depth direction of a screen in 3D images, including a sensing unit to sense movement of the mobile apparatus, and a control unit which controls a plurality of layers according to movement direction and movement distance, when movement of the mobile apparatus moving toward a depth direction of a screen is sensed.

20 Claims, 9 Drawing Sheets

(56) References Cited

U.S. PATENT DOCUMENTS

| | | | |
|---|---|---|---|
| 2007/0085829 A1* | 4/2007 | Lin | 345/158 |
| 2007/0260994 A1* | 11/2007 | Sciammarella et al. | 715/769 |
| 2008/0284798 A1* | 11/2008 | Weybrew et al. | 345/630 |
| 2010/0125816 A1* | 5/2010 | Bezos | 715/863 |
| 2010/0128034 A1* | 5/2010 | Han et al. | 345/422 |
| 2010/0138766 A1* | 6/2010 | Nakajima | 715/767 |
| 2011/0001746 A1 | 1/2011 | Kim et al. | |
| 2011/0093778 A1* | 4/2011 | Kim et al. | 715/702 |
| 2011/0157155 A1* | 6/2011 | Turner et al. | 345/419 |
| 2012/0044259 A1* | 2/2012 | Carlhian et al. | 345/629 |
| 2012/0047464 A1* | 2/2012 | Liu | 715/836 |

OTHER PUBLICATIONS

Chinese Office Action dated Jan. 5, 2016 issued in counterpart application No. 201280006690.0, 8 pages.

Notice of Acceptance dated Jan. 18, 2016 issued in counterpart application No. 2012209590, 2 pages.

* cited by examiner

MOBILE APPARATUS DISPLAYING A 3D IMAGE COMPRISING A PLURALITY OF LAYERS AND DISPLAY METHOD THEREOF

PRIORITY

This application claims priority under 35 U.S.C. §119 to a Korean Patent Application No. 2011-0008383, filed on Jan. 27, 2011, in the Korean Intellectual Property Office, the disclosure of which is incorporated herein by reference.

BACKGROUND OF THE INVENTION

1. Field of the Invention

The present invention relates generally to a mobile apparatus displaying a 3D image comprising a plurality of layers and a display method thereof, and more particularly, to a mobile apparatus which may convert layers according to the movement of an apparatus and a display method thereof.

2. Description of the Related Art

In the recent years, with the development of electronic technologies, various types of mobile apparatuses are being developed and smart phones providing various application services, exceeding services provided from existing phones, are becoming more popular.

Likewise, type and quantity of content provided by a mobile apparatus is getting diversified. However, a mobile apparatus is generally small in size, for carrying convenience. Therefore, the display size is small and a demand for technology to navigate various and numerous content on a mobile apparatus having a small display size has emerged.

SUMMARY OF THE INVENTION

The present invention has been made to address at least the above problems and/or disadvantages and to provide at least the advantages described below. Accordingly, an aspect of the present invention provides a mobile apparatus which displays a plurality of layers in 3D technologies and controls a display state by using movement of the apparatus and a display method thereof.

Accordingly, the mobile apparatus according to an embodiment of the present invention includes a display unit which displays a 3D image comprising a plurality of layers having different depth degrees from each other and arranged in a depth direction to a screen, a sensing unit which senses a movement of the mobile apparatus in the depth direction to the screen, and a control unit which controls the display unit to convert and display the plurality of layers according to a direction and a distance of the sensed movement of the mobile apparatus.

Herein, when a first layer which is one layer among the plurality of layers, the control unit may control the display unit to convert the first content into a high layer of the first layer and the high layer is activated if the mobile apparatus moves in a forward direction of the screen, and the first layer is converted into a low layer of the first layer and the low layer is activated if the mobile apparatus moves in a backward direction of the screen.

The control unit may control the display unit to display a predetermined number of low layers in a deactivated and overlapped state on a lower portion of the first layer, if the first layer is in an activated state.

The control unit may control the display unit to display the first layer as protruding toward the forward direction and disappearing and the low layer as protruding toward the forward direction and activated, if the mobile apparatus moves toward the backward direction, when the first layer, which is one of the plurality of layers, is activated.

Herein, the display unit is a touch screen and, wherein the control unit controls the display unit to convert the display of the currently activated layer into another layer in the plurality of layers and the another layer is activated according to the direction and distance of the movement if the movement is sensed when at least one content icon on the currently activated layers is touched, and the control unit controls the display unit in order to display the touched content icon by moving the touched content icon to the converted layer, if the touched content icon is released.

The control unit may navigate information on a text message receiver according to a sensed movement if movement of the mobile apparatus moving along an X axis which is parallel to the screen is sensed, when a text message application is executing, and scroll text messages according to a sensed movement if movement of the mobile apparatus which moves toward a Y axis which is parallel to the screen and perpendicular to the X axis, and navigate receiving/transmitting records of a text message according to sensed movement if movement along a Z axis which is perpendicular to a surface which is made of the X axis and the Y axis.

The display unit may display an indicator which indicates an order of a currently activated layer among the plurality of layers.

According to an embodiment, a method of displaying a mobile display apparatus comprises displaying a 3D image comprising a plurality of layers which have different degrees of depth from each other and are arranged in a depth direction to a screen, sensing movement of the mobile apparatus in the depth direction to the screen and converting at least one layer from the plurality of layers according to direction and distance of the sensed movement.

When a first layer which is one of the plurality of layers is activated, if the mobile apparatus moves in a forward direction of the screen, the first layer is converted into the high layer of the first layer and the high layer is activated and if the mobile apparatus moves in a backward direction of the screen, the first layer is converted into the low layer of the first layer and the low layer is activated.

Herein, the converting may overlap displays a predetermined number of low layers on a lower portion of the first layer, if the first layer is in an activated state.

If the mobile apparatus moves toward the backward direction when a first layer which is one of the plurality of layers is activated, converting displays the first layer as protruding toward the forward direction and disappearing, and displays the low layer as protruding toward the forward direction and activated.

If the movement is sensed when at least one content icon on a currently activated layer is touched, the currently activated layer is converted into another layer of the plurality of layers and the another layer is activated, according to direction and distance of the sensed movement and if the touched content icon is released, the touched content icon is moved and displayed on the converted layer.

The method of the present invention may further comprise displaying a text message screen if a text message application is executing, navigating information on a text message receiver which is made on the text message screen according to sensed movement if movement of the mobile apparatus which moves along an X axis which is parallel to the screen is sensed, scrolling the text message which is made on the text message screen according to sensed movement, if movement of the mobile apparatus which moves along an Y axis which is parallel to the screen and perpendicular to the X axis is sensed, and navigating text message receiving/transmitting records according to sensed movement, if movement of the mobile apparatus which moves along a Z axis which is perpendicular to a surface which is made of the X axis and the Y axis is sensed.

The method may further comprise displaying an indicator which indicates an order of a currently activated layer among the plurality of the layers.

Herein, the method may further comprise converting into a layer which corresponds to a selected image if one image among the plurality of images is selected on the indicator.

As described above, according to various embodiments of the present invention, a user may search content or functions which a user want conveniently by moving the mobile apparatus in various directions and angles.

BRIEF DESCRIPTION OF THE DRAWINGS

The above and/or other aspects of the present invention will be more apparent by describing certain embodiments of the present invention with reference to the accompanying drawings, in which.

DETAILED DESCRIPTION OF EMBODIMENTS OF THE PRESENT INVENTION

Figure 1:
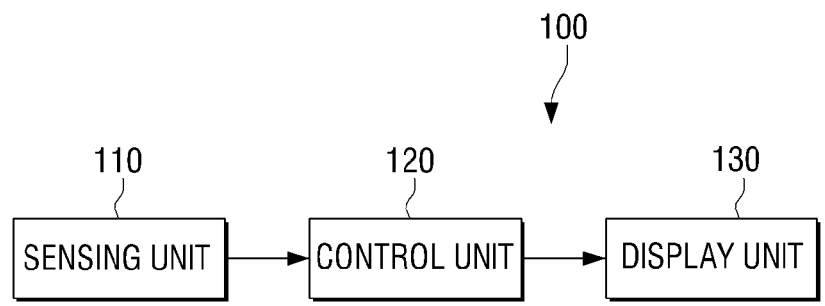
FIG. 1 is a block diagram illustrating a configuration of a mobile apparatus according to an embodiment of the present invention.

Certain embodiments of the present invention are described in greater detail below with reference to the accompanying drawings. In the following description, similar drawing reference numerals are used for similar elements throughout the drawings. The matters defined in the description, such as detailed construction and elements, are provided to assist in a comprehensive understanding of the present invention. Thus, it is apparent that the present invention can be carried out without those specifically defined matters. Also, well-known functions or constructions are not described in detail since they would obscure the present invention with unnecessary detail.

FIG. 1 is a block diagram illustrating a configuration of a mobile apparatus according to an embodiment of the present invention. According to FIG. 1, the mobile apparatus 100 includes a sensing unit 110, a control unit 120, and a display unit 130. The mobile apparatus 100 may be of various kinds of portable display apparatuses such as a mobile phone, a PDA, a portable video game, a notebook PC, an electronic book, and a MP3 player.

The sensing unit 110 senses movement of the mobile apparatus 100 and may be of various sensor types such as a geomagnetic sensor, an accelerator sensor, a gyro sensor, and a motion sensing sensor. Additionally, the sensing unit 110 may measure various parameters which are changed by the mobile apparatus 100 such as rotation of the mobile apparatus 100, tilt degree of the mobile apparatus 100, change of cardinal direction that a front end of the mobile apparatus 100 head towards, changes of a pitch angle, a roll angle, and a yaw angle, and inform a control unit 120 of the measurement. Specifically, the sensing unit 110 may sense movement that moves in depth direction to a screen such as a forward direction protruding from a screen of a display unit 130 or a backward direction caving inward into a screen direction. Conversely, in order to sense movement in depth direction of the screen, the sensing unit 110 may be a photographing component photographing external environments.

Where the sensing unit 110 is a the photographing component, the sensing unit 110 may photograph a user's face facing a screen of the mobile apparatus 100, and transmit the photographing result to the control unit 120.

If a size of a recognized face is bigger than a size of the face of the previous photographing frame, the control unit 120 may determine that the mobile apparatus has moved toward the direction protruded from the screen. If a size of a recognized face is smaller than the size of the face of the previous photographing frame, the control unit 120 may determine that it is in the case where the mobile apparatus is moved toward the direction entering the screen. Alternatively, the determination may be performed by the sensing unit 110. That is, the sensing unit 110 compares the photographing result and then if it is determined that the sensing unit 110 is moved toward the direction protruded from the screen, or moved toward the direction caving inward into the screen, the sensing unit 110 may output a control signal corresponding to the determination result to the control unit 120.

The display unit 130 performs a 3D display. Specifically, the display unit 130 displays a plurality of layers in 3D images which have different depth degrees from each other and are arranged in a depth direction to a screen.

The depth degree refers to a degree of protrusion from the screen, or a degree of caving inward a lower portion of the screen. That is, according to the method of 3D display, a user may feel a three-dimensional effect by a disparity between a left image and a right image. The depth degree may represent the three-dimensional effectiveness. In addition, the layers refer to at least more than one content is displayed at the same depth degree.

To display images in 3D, the display unit 130 includes a converting unit (not illustrated) converting each image of the layers into 3D data. The 3D display method may be separated into a stereoscopy method or auto stereoscopy method depending on the necessity of 3D glasses. That is, in case of stereoscopy method that a user wears 3D glasses for viewing 3D images, the converting unit generates a selected subject's image in a left-eye image and a right-eye image respectfully. The left-eye image and the right-eye image are images where the same subject is watched from different views. A distance between two blocks corresponding to the left-eye image and the right-eye image respectively may be the three dimensional effectiveness, that is, the depth degree as mentioned above. The display unit 130 alternatively outputs the left-eye image and the right-eye image for a predetermined number of times. The control unit 120 transmits sync signals corresponding to the alternative output timing of the left-eye image and the right-eye image are transmitted to the 3D glasses apparatus by using a signal transmitting unit (not illustrated) separately provided. Accordingly, viewing 3D images may be possible by alternatively turning on a left side and a right side of the 3D glasses according to the sync signals.

In the auto stereoscopy 3D method which does not require 3D glasses for viewing 3D images, the converting unit converts an image of a selected object into a multi-view image. Specifically, the converting unit estimates a changed degree of distance from the subject and a degree of directional change when a view point is changed by using a focus distance and a depth of the subject based on image signals. The converting unit generates new images by moving locations of each pixel of a reference image according to the estimation result. The generated image may be an image that the subject is watched from a state separated by a predetermined angle from the reference image. In this manner, the converting unit may generate a plurality of multi-view images.

The display unit 130 partially separates and outputs the multi-view images so that a user may feel a distance from the subject without wearing glasses and recognize the multi-view images as 3D images. For example, if nine multi-view images are generated, each multi-view image is sequentially output from one side of the screen, and on a location where the last ninth image output is end, an image is output again from the first image at various angles towards the front of the screen. Accordingly, a user may feel the three dimensional effect without wearing glasses. In addition, the numbers of the multi-view images are not limited to nine, and the numbers of display directions may also be changed according to the numbers of the multi-view images. Furthermore, the display unit 130 may include a display panel according to a parallax a barrier technology or a lenticular technology in order to output the multi-view images In the above-mentioned embodiment, the converting unit is included in the display unit 130, which is variable and the converting unit may be a separate component outside of the display unit 130.

Figure 2:
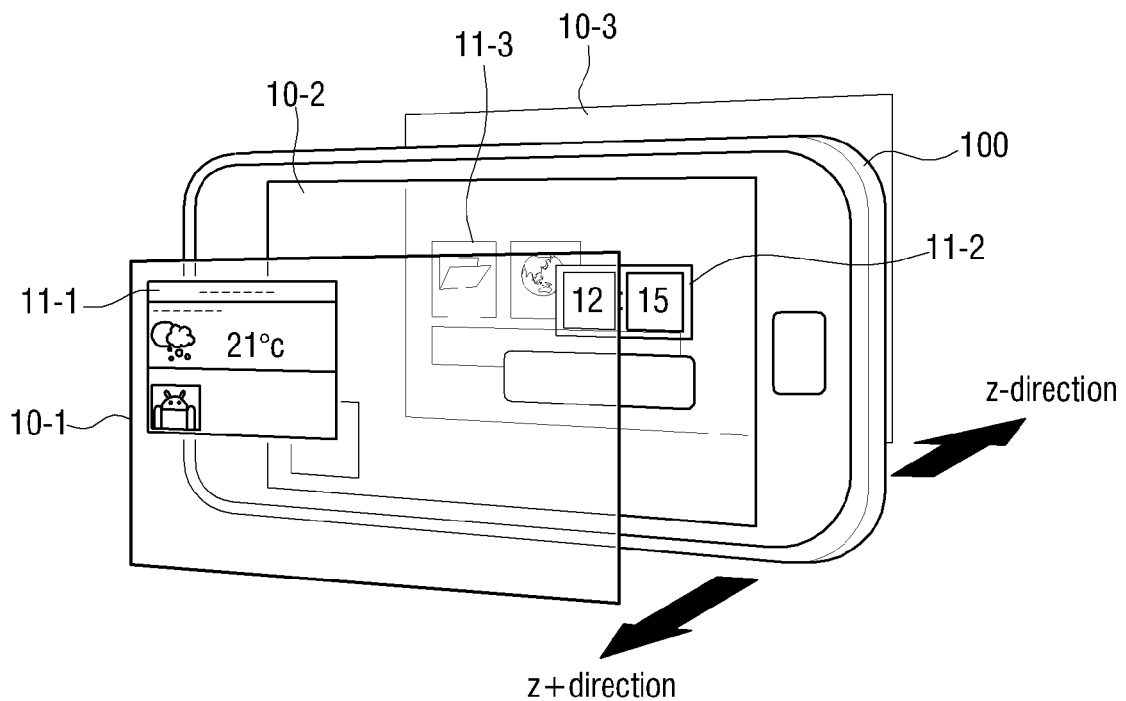
FIG. 2 is a diagram illustrating a display state of the mobile apparatus according to an embodiment of the present invention.

FIG. 2 is a diagram illustrating an example of a picture of a mobile apparatus displaying a plurality of layers. As illustrated in FIG. 2, the mobile apparatus 100 sequentially displays a plurality of layers 10-1, 10-2, and 10-3 having different depth degrees from each other.

On each layer 10-1, 10-2, or 10-3, at least one content may be displayed. Herein, content refers to various types of objects such as an icon, a UI window, a widget window, and a document window.

Each layer 10-1, 10-2, and 10-3 may be called a high layer 10-1, a standard layer 10-2, and a low layer 10-3 respectively. The standard layer 10-2 refers to a layer which is currently in an activated state in the mobile apparatus 100. Generally, the standard layer 10-2 may represent a layer which is displayed on the screen with the same depth degree with a screen of the mobile apparatus. On the other hand, the high layer 10-1 represents a layer protruded perpendicularly to the standard layer 10-2, and the low layer 10-3 represents a layer caved in perpendicularly to the standard layer 10-2.

A user may convert a layer by moving the mobile apparatus toward the first direction or the second direction which are perpendicular to the screen. Herein, the first direction and the second direction may be opposite directions from each other.

Specifically, as described in FIG. 2, if the mobile apparatus is moved toward a Z+ direction protruded from the screen, a layer is converted into the high layer 10-1. On the contrary, if the mobile apparatus is moved toward a Z− direction, a layer is converted into the low layer 10-3. If layer conversion is implemented, the converted layer is activated. Accordingly, it is possible to carry out a numbers of works such as selecting content on the activated layer or running menus.

In a process of the layer conversion, space affordance may be provided. That is, in a case where the standard layer 10-2 is converted into the low layer 10-3, the standard layer 10-2 may be displayed where the standard layer 10-2 as protruding toward the Z+ direction and gradually disappearing. On the contrary, if the standard layer 10-2 is converted into the high layer 10-, the standard layer 10-2 may be displayed so that the standard layer 10-2 may be caved in toward the Z− direction and faintly seen.

If speed of movement or distance of movement is significant, a plurality of layers may be converted. That is, if the low layer 10-3 is moved faster or further than an ordinary case in the Z+ direction when the low layer 10-3 is activated, the high layer 10-1 may be activated immediately. Accordingly, conversion speed or conversion unit may be changed according to features of movement such as movement distance, movement direction, and movement speed.

Figure 3:
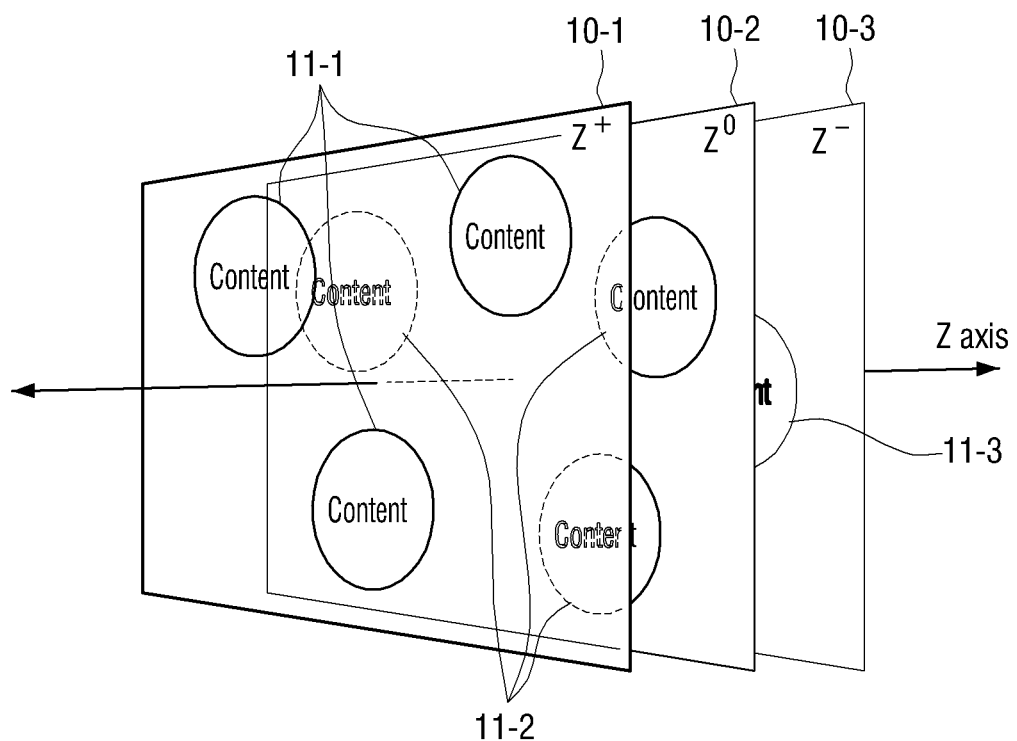
FIG. 3 is a diagram illustrating a converting process between a plurality of layers, according to an aspect of the present invention

FIG. 3 is a diagram illustrating shapes of a variety of layers. According to FIG. 3, it may be understood that a plurality of layers 10-1, 10-2, and 10-3 are disposed in a direction perpendicular to the screen. In addition, content 11-1, 11-2, and 11-3 are arranged on the layers 10-1, 10-2, and 10-3. Accordingly, by movement toward the Z+ direction or movement toward the Z− direction, conversion among the layers 10-1, 10-2, and 10-3 may be carried out.

In FIGS. 2 and 3, only three layers are illustrated, which correspond to layers which has a three dimensional effectiveness and be displayed at the same time. That is, only a predetermined number of layers among all the layers are displayed all at once and the remaining layers may not be displayed.

That is, when the first layer which is one of the plurality of layers is activated, the control unit 120 may control the display unit 130 to display at least one among the low layers as doubly displayed in a non-activated state on the lower portion of the first layer. In this state, the control unit 120 may control the display unit 130 if the mobile apparatus moves toward the Z− direction, that is, the second direction, to display the first layer as protruding toward the first direction and disappearing and the second layer which has been on the lower portion of the first layer may be displayed as protruding toward the Z+ direction and appear activated. In addition, the control unit 120 controls the display unit 130 to display a new third layer which has not been displayed previously as doubly displayed in a non-activated state on the lower portion of the second layer. On the contrary, if the mobile apparatus 100 is moved toward the Z+ direction when the first layer is activated, the high layer of the first layer may be activated, the first layer may be sunken toward the Z-direction, and the second layer may be completely disappeared.

Accordingly, it is possible to maintain the two to four layers to be always doubly displayed together. If in a case where the lowest layer is displayed, overlap-display may be omitted because layers do not exist on the lower portion of the layers anymore.

For convenience of description, in FIGS. 2 and 3, the Z+ and Z− directions are described, but the movements do not need to be perpendicular to the screen. That is, it is possible to convert the layers according to the movement, both when a user lifts up the mobile apparatus toward the screen direction by drawing a curve bending one's arm and when a user lets mobile apparatus fall by unfolding one's arm. Such conversion may be applicable to all embodiments described below.

An order of the layer of the currently activated layers among all the layers may be easily checked by a user. To achieve this, an indicator may be displayed on each of layers. The indicator represents icons, images, numbers, and characters to show the order of the currently activated layers among a plurality of layers.

Figure 4:
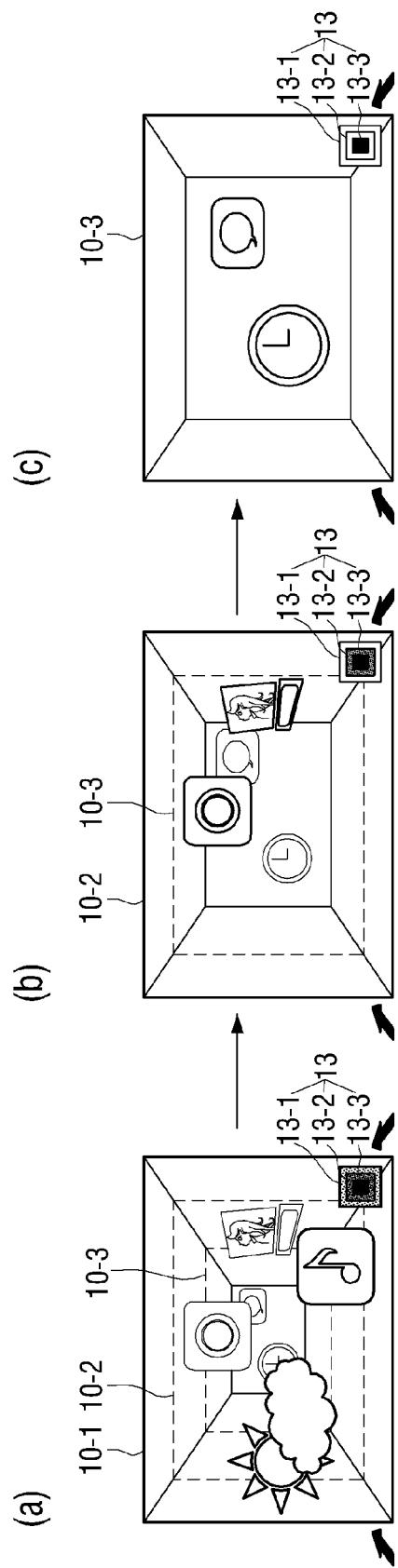
FIGS. 4 to 6 are diagrams illustrating a conversion of the layers and numbers of examples of indicator displaying methods accordingly.

FIG. 4 is a diagram illustrating the indicator and describing a method of converting the plurality of layers. According to FIG. 4, the plurality of layers 10-1, 10-2, and 10-3 are sequentially arranged on the mobile apparatus 100 and displayed in 3D.

In addition, the indicator 13 which allows a user to check an order of the currently activated layer among the plurality of layers may be displayed on the screen.

The indicator 13 may be displayed in various types according to various embodiments.

In FIG. 4, it may be understood that the plurality of layers 10-1, 10-2, and 10-3 are sequentially displayed, and the indicator 13 is displayed in a type including a plurality of cells provided with the same numbers with the overall layers. In FIG. 4, it may be understood that three layers are displayed in total and the numbers of the cells are three accordingly (that is, 13-1, 13-2, and 13-3).

Herein, the plurality of cells 13-1, 13-2, and 13-3 have different sizes from each other and are arranged as overlapping from each other based on a center.

As described in FIG. 4(a), if the highest layer among all the layers is activated, colors are displayed on all of the plurality of cells 13-1, 13-2, and 13-3. Herein, colors may be different or the same by each cell. In a case where the colors are the same, density of a color of each cell may be set differently.

A color is eliminated from the most outer cell of the indicator 13 if a layer gets converted into lower layer. That is, as described in FIG. 4(a), if the mobile apparatus moves toward the Z− direction when the highest layer 10-1 is displayed, the layer is converted into the second layer 10-2 and a color is eliminated in the most outer cell 13-1 of the indicator 13 as described in FIG. 4(b). In this state, if the mobile apparatus moves toward the Z− direction again, the layer is converted into the third layer 10-3 as described in FIG. 4(c), a color of the most outer cell 13-2 is eliminated in the indicator 13 again. Accordingly, a color is displayed only in the first cell 13-3 of the indicator 13. If the conversion is again carried out toward the upper direction after the conversion into the lower layer, the numbers of color displays are added as the numbers of cells converted toward an outer direction. That is, if the mobile apparatus moves toward the Z+ direction in a state of 4(c), a color is displayed up to the second cell 13-2 of the indicator 13 as described in FIG. 4(b).

Figure 5:
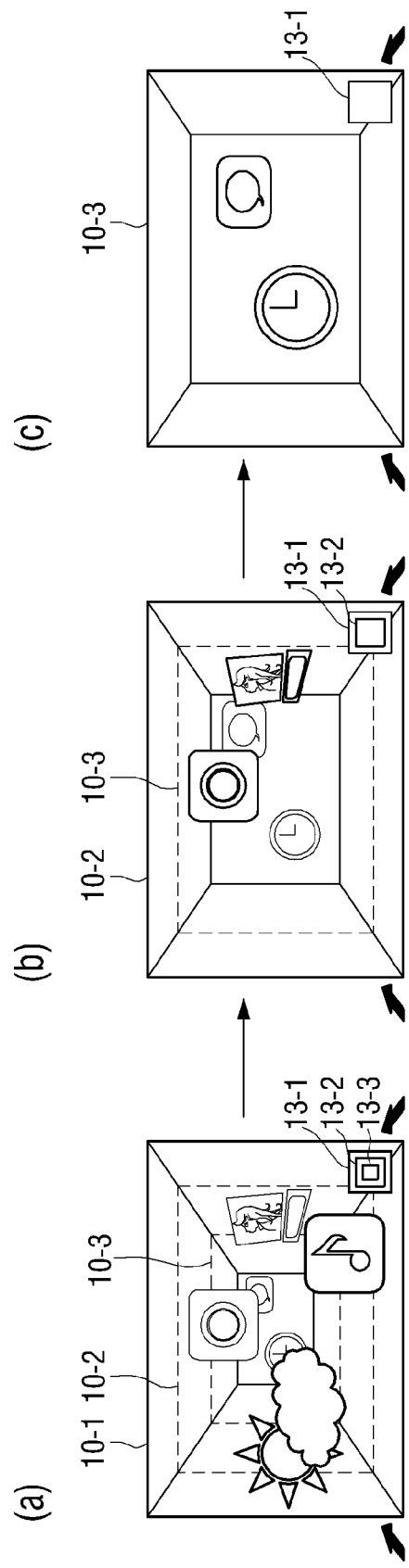

FIG. 5 is a diagram illustrating another embodiment of the indicator.

According to FIG. 5, the indicator includes a plurality of images, a number of which is provided equally to the number of the plurality of layers. Herein, the plurality of images may have different sizes and colors from each other and be displayed overlapping in an order equal to an order of a layer corresponding to each image. Accordingly, if one layer is activated, it may be possible to convert that the display so that an image corresponding to the activated layer may be displayed on the highest position.

That is, as described in FIG. 5(a), when the highest layer 10-1 is displayed, all of the images 13-1, 13-2, and 13-3 are displayed at the same time. In this state, if the mobile apparatus 100 moves toward the Z− direction and the second layer 10-2 is displayed, the highest image 13-3 is disappeared and only the images from the second image corresponding to the second layer 10-2 to the last image 13-1 are displayed. If the mobile apparatus 100 moves toward the Z− direction, the third image 13-1 is displayed on the indicator 13 as described in FIG. 5(c).

Figure 6:
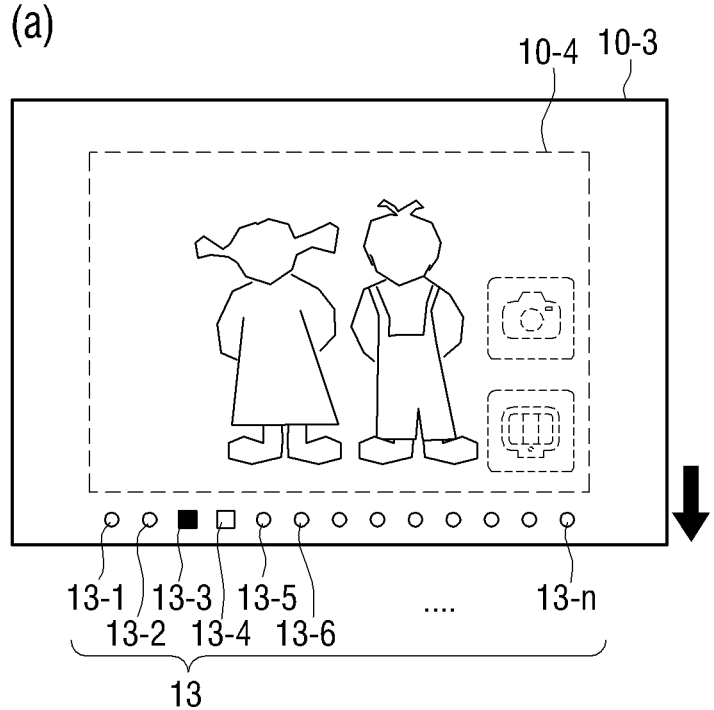
Figure 6:
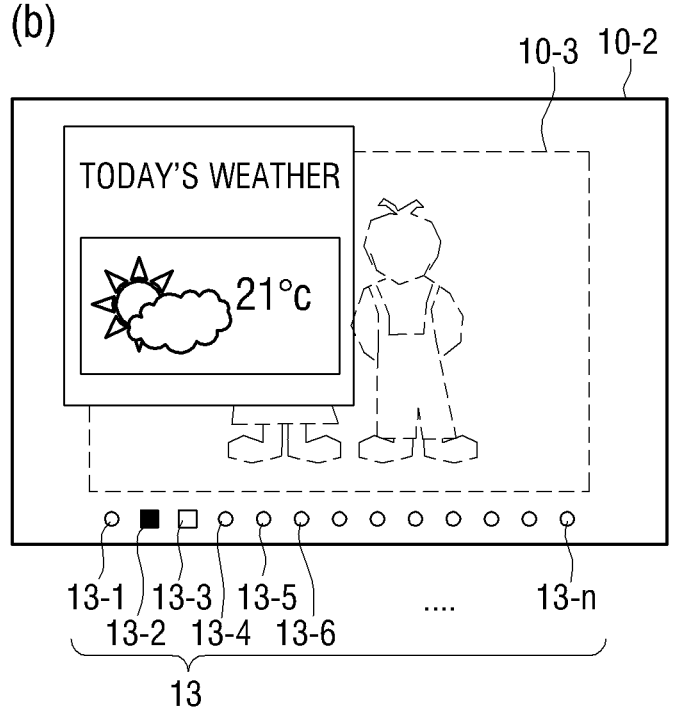

FIG. 6 is a diagram illustrating another embodiment of the indicator of the present invention.

According to FIG. 6, the indicator 13 includes a plurality of images 13-1 to 13-n numbers of which equally correspond to the numbers of the plurality of layers. Herein, the plurality of images are arranged in an order equal to an order of a layer corresponding to each image in one region on the screen. Specifically, the plurality of images may be arranged in one line on a lower position of the screen as described in FIG. 6.

Here, among the plurality of images, a state of at least one image including an image corresponding to the currently activated layer may be displayed differently from the remaining images. That is, in FIG. 6, when the third layer 10-3 among the n numbers of layers is activated, the third image 13-3 and the fourth image 13-4 among the images of the indicator 13 may be displayed in a rectangular shape, and the remaining images 13-1, 13-2, and 13-5 to 13-n may be displayed in a round shape. Herein, the numbers of images displayed in a rectangular shape may be equal to the numbers of layers displayed in 3D on the current screen. That is, in FIG. 6, since two layers are displayed overlapping in 3D manner, only two images 13-3 and 13-4 are displayed in a rectangular shape, but in a case where three layers are displayed overlapping, three images 13-3, 13-4, and 13-5 may be displayed in a rectangular shape.

In addition, among the third, fourth, and fifth images 13-3, 13-4, and 13-5, with respect to the third image 13-3 corresponding to the activated layer 10-3, discrimination may be added by methods of displaying colors differently or blinking colors. As illustrated in FIG. 6(a), if the mobile apparatus 100 moves toward the Z+ direction when the third layer 10-3 is activated, the second layer 10-2 is activated as illustrated in FIG. 6(b) and the second image 13-2 among the images of the indicator 13 is changed into a rectangular shape. Here, the fourth image 13-4 which has been displayed in a rectangular shape is converted into a round shape. Likewise, it is possible to inform a user of a conversion state of the layers and a current layer order via the indicator 13.

The control unit 120 may control the display unit 130 so that a layer may be converted into a layer corresponding to a selected image, if one image among the plurality of images on the indicator 13. That is, if the sixth image 13-6 in the indicator 13 is touched in a state of FIG. 6(b), it is possible to activate a layer corresponding to the image and overlap-display the low layer of the layer in a non-activated state on a lower portion.

A user may easily perform an operation moving a location of content by moving the mobile apparatus and touching a screen. Likewise, for a case where a touch is necessary, the display unit 130 may include a touch screen.

Figure 7:
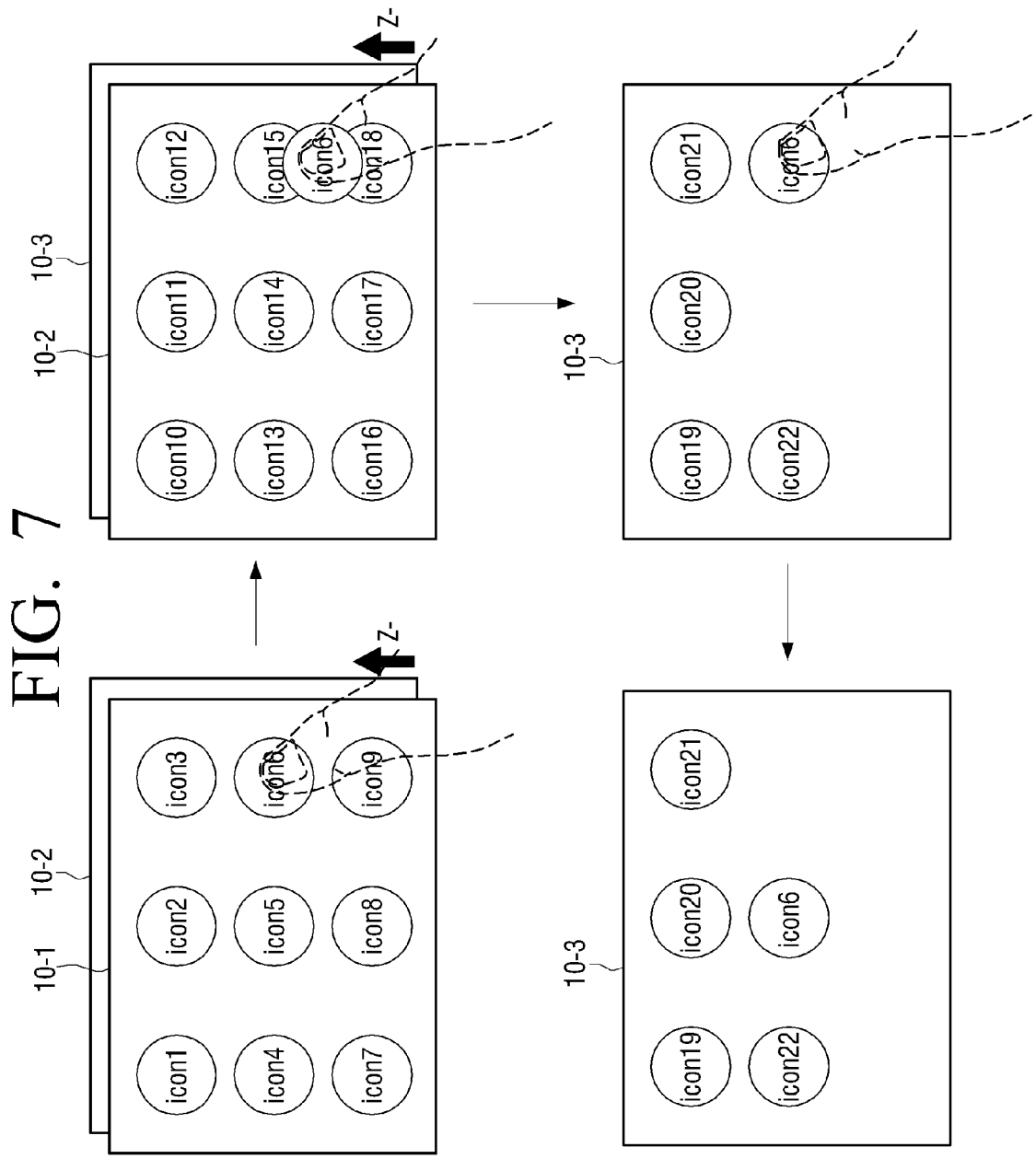
FIG. 7 is a diagram illustrating an example moving a location of content.

FIG. 7 is a diagram illustrating an embodiment of a method of moving a content location according to the present invention.

According to FIG. 7, when two layers 10-1 and 10-2 are displayed overlapping, a user may touch icon 6 which is one content among content on the activated first layer 10-, and move the mobile apparatus 100 in the Z− direction. Here, a depth degree of the touched icon 6 is maintained and a depth degree of the second layer 10-2 is increased and activated. That is, the icon 6 may be displayed with other icons icon 10- to icon 18 on the second layer 10-2. If the mobile apparatus is moved toward the Z− direction again, the layer is converted into the third layer 10-3 and the icon 6 is displayed with other icons on the third layer 10-3. In this state, if a user detaches and releases his/her finger touching the icon 6, the control unit 120 controls the display unit 130 in order to display the icon 6 on the third layer 10-3.

Likewise, a user may convert a location of an object such as content conveniently by using a touch and movement of an apparatus.

The control operation according to movement of the above-described mobile apparatus may be used in a variety of functions. For example, a text message transmitting/receiving work. In case of a word processor work, the work may be carried out on a variety of layers, and may convert work performance state by using movement.

Figure 8:
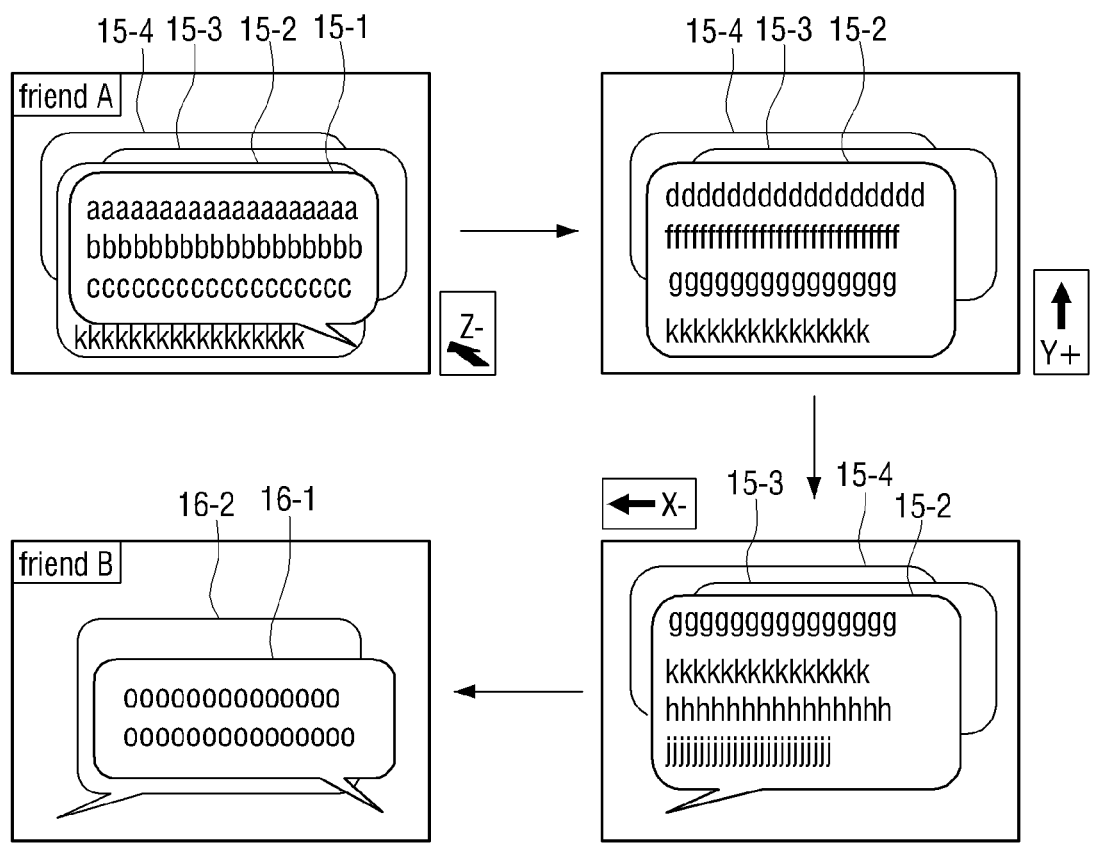
FIG. 8 is a diagram illustrating an example of a method of using a text message service on a mobile apparatus according to an embodiment.

FIG. 8 is a diagram illustrating a method of transmitting a text message in a mobile apparatus according to an embodiment of the present invention.

If a text message application is executing, a variety of message windows may be displayed on the screen. Herein, a depth degree of each message window may be determined differently. That is, as the above-described layers, each of message windows may be classified into a plurality of layers and displayed overlapping in a 3D manner.

A user may use a message service by moving the mobile apparatus 100 toward a X axis direction (that is, toward the left or the right) parallel to the screen, toward a Y axis direction (that is, toward the top or the bottom) perpendicular to the X axis and parallel to the screen, or toward a Z direction (that is, toward the front or the back) perpendicular to a flat surface which is composed of the X axis and the Y axis. Herein, an operation according to movement of each direction may be determined differently according to an embodiment.

For example, if movement moving along the X axis direction is sensed, the control unit 120 converts and displays receiver information by controlling the displaying unit 130 in order to navigate receiver information of a text message according to sensed movement. On the contrary, if movement moving along the Y axis direction is sensed, the control unit 120 may scroll text message according to the sensed movement. In addition, the control unit 120 may convert an activation state of overlapping text message windows in order to navigate test message receiving/transmitting records according to sensed movement if movement moving along the Z axis direction is sensed.

Specifically, according to FIG. 8, if the mobile apparatus is moved toward the Z axis direction as the Z+ direction when a text message window relating to "friend A" is displayed, the text message window is changed. Accordingly, message receiving/transmitting records of the received/transmitted text message with friend A, the same message receiver, may be checked. Alternatively, it is possible to make a numbers of text messages at the same time by using a plurality of text message windows, and determine one message receiver or a plurality of message receivers and transmit the text messages at once or separately.

According to FIG. 8(*a*), if the mobile apparatus moves toward the Z− direction when the first message window 15-1 is displayed, the second message window 15-2 is displayed as illustrated in FIG. 8(*b*).

Here, if the mobile apparatus 100 moves toward the Y+ direction, a message on the currently displayed message window 15-2 is scrolled. Accordingly, as illustrated in FIG. 8(*c*), a message on the low portion of the second message window 15-3 is displayed. In this state, if the mobile apparatus 100 moves toward the X-direction, a message receiver is changed from "friend A" into "friend B", and the message window is changed into the message windows 16-1 and 16-2 received from and transmitted to the "friend B".

FIG. 8 describes an example of a process of checking a text message, but the example may be applied to a process of making a message similarly. That is, movement toward the Z+ direction and the Z− direction may change the message window which is being made, movement toward the X+ direction and the X− direction may change the message receiver, and movement toward the Y+ direction and the Y− direction may be a work such as scrolling a text message.

As described above, a movement direction and a performance function of the mobile apparatus is not necessarily limited to FIG. 8, and may be changed variously according to an embodiment of the present invention.

Figure 9:
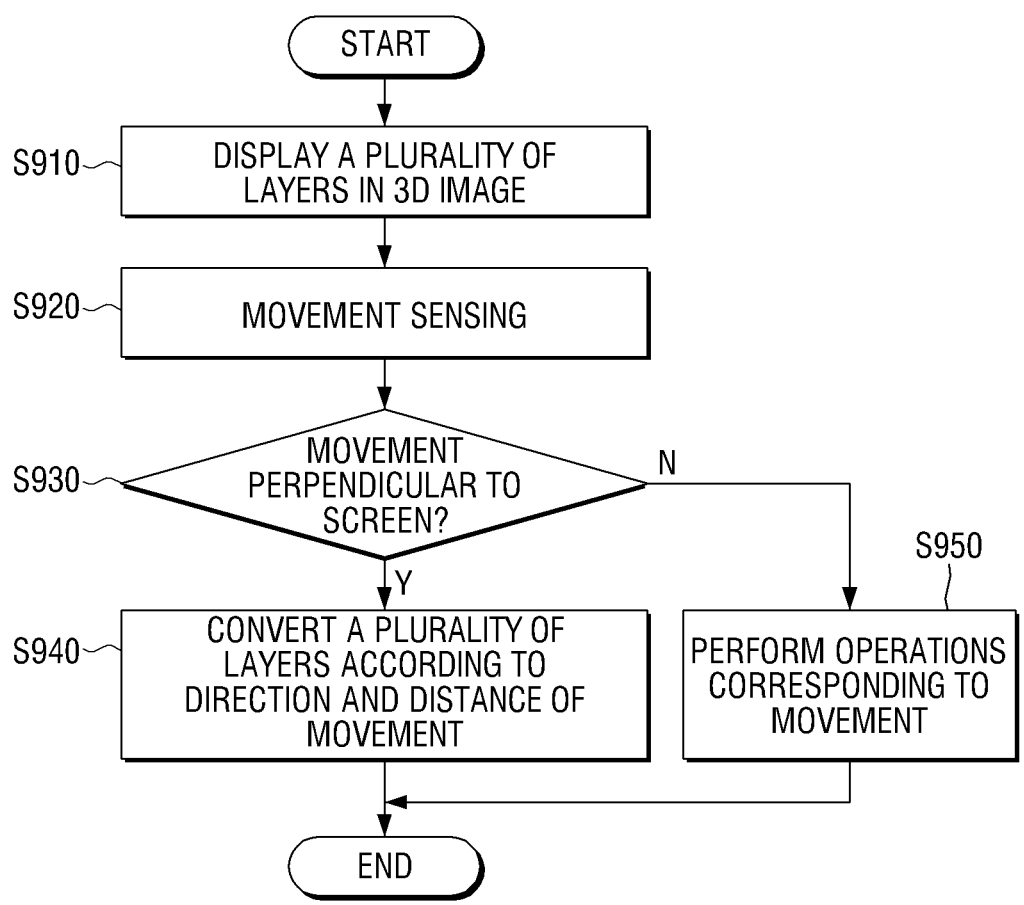
FIG. 9 is a flowchart of display methods of the mobile apparatus according to various embodiments of the present invention.

FIG. 9 is a flowchart to describe a method of displaying the mobile apparatus according to various embodiments of the present invention.

According to FIG. 9, in S910 where a plurality of layers are displayed in 3D images, if movement is sensed S920, it is determined S930 that whether the movement is toward a direction perpendicular to the screen. If it is determined that the movement is toward the direction perpendicular to the screen, an activation state of the plurality of layers are converted S940 according to the movement direction and the movement distance.

The conversion methods are described in the above-mentioned embodiments and thus, they will be omitted in the following description.

When an activation state of each layer is converted, an indicator that may indicate the conversion state may be displayed together. An indication type and a conversion method are described in FIGS. 4 to 6, a specific description thereof will be omitted.

If it is determined that the movement is not toward the direction perpendicular to the screen, operation corresponding to the movement is performed S950. Here, if there is no operation corresponding to the movement, any particular movement may not be performed. On the contrary, as the above-described message method, if operations corresponding to movements corresponding to the X axis direction and the Y axis direction are set, operations corresponding to the movements may be performed.

In addition, if the mobile apparatus is moved when at least one content is selected on the activated layer, it is possible to maintain a depth degree or a location of the selected content although a screen or a layer is converted according to the movement. Then, if the content selection is released when the movement stops and a new screen or a new layer is activated, a relevant content location may be moved and displayed on the activated new screen or a new layer. This operation may be included in the display method of the present invention.

As described above, conversions among the layers are carried out according to movement of the mobile apparatus. However, the conversions are not limited to the movement of the mobile apparatus and may be carried out by a panning operation on the screen.

Figure 10:
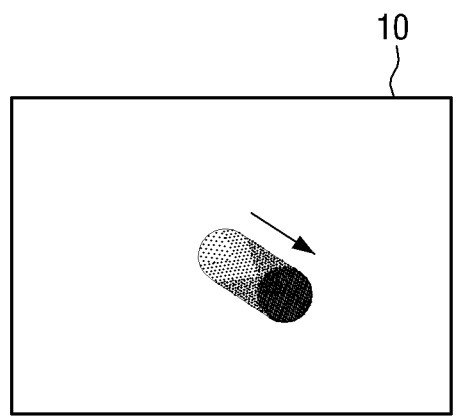
FIGS. 10 and 11 are diagrams illustrating an example of a panning operation, according to the present invention.
Figure 11:
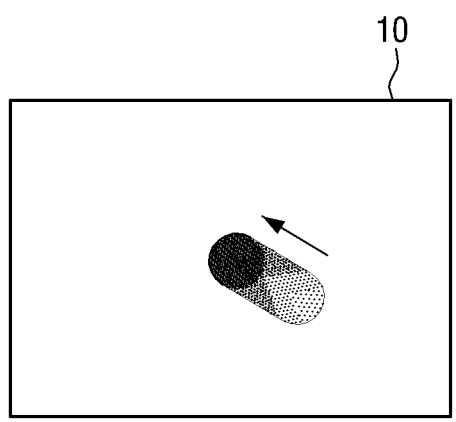

FIGS. 10 and 11 are diagrams illustrating various embodiments of the panning operation.

According to FIG. 10, if regions around a center of the screen is touched when one layer among a plurality of layers is activated and the panning operation which moves a touch point toward an edge direction is carried out as an arrow, a layer is converted into a high layer or a low layer accordingly.

On the contrary, as described in FIG. 11, if an edge region of the screen is touched and the panning operation which moves the touch point toward the center direction of the screen is carried out as an arrow, a layer is converted into a layer whose direction is opposite to FIG. 10. That is, if the panning operation of FIG. 10 is an operation converting the layer into the high layer as a movement toward the Z+ direction, the panning operation of FIG. 11 may be an operation converting the layer into the low layer as movement toward the Z− direction.

The panning operations in FIGS. 10 and 11 may be used as a method to convert the plurality of layers as movement of the mobile apparatus by being combined with a numbers of embodiments described above.

Accordingly, a user may select and use content conveniently by converting a plurality of layers in convenient and various manners.

The display method according to various embodiments of the present invention may be stored in a various recording media implemented as program code. Specifically, the display method may be stored in various kinds of recording media readable on a terminal such as RAM (Random Access Memory), a flash memory, a ROM (Read Only Memory), an EPROM (Erasable Programmable ROM), an EEPROM (Electronically Erasable and Programmable ROM), a register, a hard disk, a removable disk, a memory card, a USB memory, and a CD-ROM.

Accordingly, a program may be installed which carries out the display method in an apparatus where the above media are connected or mounted.

The foregoing embodiments and advantages have been shown and described to illustrate aspects of the present invention and are not to be construed as limiting the present invention. The present invention can be readily applied to other types of apparatuses. Also, the description of the embodiments of the present invention is intended to be illustrative, and not to limit the scope of the claims, and it would be appreciated by those skilled in the art that changes may be made to the embodiments without departing from the principles and spirit of the invention, the scope of which is defined in the appended claims.

What is claimed is:

1. A mobile apparatus, comprising:
a display unit which displays a 3D image comprising a plurality of layers having different depths from each other and arranged sequentially in a depth direction to a screen, each of the plurality of layers including at least one content icon;
a sensing unit which senses a movement of the mobile apparatus parallel to the depth direction to the screen; and
a control unit which activates one layer among the plurality of layers, changes the activated layer to another layer according to a direction and distance of the sensed movement when the movement of the mobile apparatus parallel to the depth direction to the screen is sensed and displays a new activated layer,
wherein the display unit displays an indicator which includes a plurality of images corresponding to the number of the plurality of layers and indicates currently-activated layers using the plurality of images, and
wherein while an upper layer is activated from among the plurality of layers, the control unit controls the display unit to display at least one content icon included in the upper layer and at least one content icon included in a lower layer of the upper layer, and in response to a movement of the mobile apparatus to activate the lower layer being detected, removes at least one content icon included in the upper layer and displays a content icon of the lower layer.

2. The apparatus as claimed in claim 1, wherein the control unit controls the display unit to change a first layer, among the plurality of layers, into a high layer of the first layer and activate the high layer if the mobile apparatus moves in a forward direction of the screen, and change the first layer, among the plurality of layers, into a low layer of the first layer and activate the low layer if the mobile apparatus moves in a backward direction of the screen.

3. The apparatus as claimed in claim 2, wherein, the control unit controls the display unit to display a predetermined number of low layers in a deactivated and overlapped state on a lower portion of the first layer, if the first layer is in an activated state.

4. The apparatus as claimed in claim 2, wherein the control unit controls the display unit to display the first layer as protruding toward the forward direction and disappearing and the low layer as protruding toward the forward direction and activated, if the mobile apparatus moves toward the backward direction, when the first layer, which is one of the plurality of layers, is activated.

5. The apparatus as claimed in claim 1, wherein the display unit is a touch screen and the control unit controls the display unit to change the display of at least one of the currently activated layers into at least one another layer in the plurality of layers and activate the display of the at least one another layer according to the direction and distance of the movement if the movement is sensed when at least one of the content icons on the currently activated layers is touched, and the control unit controls the display unit to display the at least one touched content icon by moving the at least one touched content icon to the changed layer, if the at least one touched content icon is released.

6. The apparatus as claimed in claim 1, wherein the control unit controls the navigation of information on a text message receiver according to a sensed movement if movement of the mobile apparatus moving along an X-axis which is parallel to the screen is sensed, while a text message application is executing, scrolls text messages according to a sensed movement if movement of the mobile apparatus which moves toward a Y-axis which is parallel to the screen and perpendicular to the X-axis, and
controls the navigation of receiving/transmitting records of a text message according to sensed movement if movement along a Z-axis which is perpendicular to a surface which is made of the X-axis and the Y-axis.

7. The apparatus as claimed in claim 1, wherein the indicator further includes a plurality of cells whose numbers equally correspond to numbers of the plurality of the layers, wherein the plurality of cells have different sizes from each other and are arranged by being overlapped with each other on a same center, wherein if a highest layer is activated among the plurality of layers, colors of all cells are displayed, and a color gets eliminated from a most outer cell if activation gets carried out toward a low layer.

8. The apparatus as claimed in claim 1, wherein the plurality of images included in the indicator have numbers that equally correspond to the numbers of the plurality of layers, the plurality of images have different sizes and colors from each other and are overlapped in an same order to the plurality of images, and if a layer is activated, an image which corresponds to the activated layer is displayed on a highest portion.

9. The apparatus as claimed in claim 1, wherein the plurality of images included in the indicator have numbers that equally correspond to the numbers of the plurality of layers, wherein the plurality of images are arranged on the screen in a same order to an order of layers, and wherein among the plurality of images, display state of at least one image corresponding to a currently activated layer is changed to be differentiated from the remaining images.

10. The apparatus as claimed in claim 9, wherein if an image is selected among the plurality of the images on the indicator, the control unit controls the display unit to change the selected image into a layer which corresponds to the selected image.

11. A method of displaying a 3D image in a mobile apparatus, comprising:
- displaying the 3D image comprising a plurality of layers which have different depths from each other and are arranged sequentially in a depth direction to a screen, each of the plurality of layers including at least one content icon;
- sensing movement of the mobile apparatus parallel to the depth direction to the screen;
- changing an activated layer among the plurality of layers according to direction and distance of the sensed movement when the movement of the mobile apparatus parallel to the depth direction to the screen is sensed;
- displaying an indicator which includes a plurality of images corresponding to the number of the plurality of layers and indicates currently-activated layers using the plurality of images;
- displaying, while an upper layer is activated from among the plurality of layers, at least one content icon included in the upper layer and at least one content icon included in a lower layer of the upper layer; and
- removing, in response to a movement of the mobile apparatus to activate the lower layer being detected, at least one content icon included in the upper layer and displaying a content icon of the lower layer.

12. The method as claimed in claim 11, wherein if a first layer which is one of the plurality of layers is activated, and the mobile apparatus moves in a forward direction of the screen, the first layer is changed into the high layer of the first layer and the high layer is activated and if the mobile apparatus moves in a backward direction of the screen, the first layer is changed into the low layer of the first layer and the low layer is activated.

13. The method as claimed in claim 12, wherein changing the layer displays a predetermined number of low layers in a deactivated and overlapped state on a lower portion of the first layer, if the first layer is in an activated state.

14. The method as claimed in claim 12, wherein if the mobile apparatus moves toward the backward direction when a first layer which is one of the plurality of layers is activated, changing displays the first layer as protruding toward the forward direction and disappearing, and displays the low layer as protruding toward the forward direction and activated.

15. The method as claimed in claim 11, wherein if the movement is sensed when at least one of the content icons on at least one of the currently activated layers is touched, the at least one currently activated layer is changed into at least one another layer of the plurality of layers and the at least one another layer is activated, according to direction and distance of the sensed movement and if the touched content icon is released, the at least one touched content icon is moved and displayed on the changed layer.

16. The method as claimed in claim 11, further comprising:
- displaying a text message screen when a text message application is executing;
- navigating information on a text message receiver which is made on the text message screen according to sensed movement if movement of the mobile apparatus which moves along an X-axis which is parallel to the screen is sensed;
- scrolling the text message which is made on the text message screen according to sensed movement, if movement of the mobile apparatus which moves along a Y-axis which is parallel to the screen and perpendicular to the X-axis is sensed; and
- navigating text message receiving/transmitting records according to sensed movement, if movement of the mobile apparatus which moves along a Z-axis which is perpendicular to a surface which is made of the X-axis and the Y-axis, is sensed.

17. The method as claimed in claim 11, wherein the indicator further includes a plurality of cells, numbers of which equally correspond to the numbers of the plurality of the layers, wherein the plurality of cells have different sizes from each other and are arranged as overlapping on a same center, wherein if a highest layer among the plurality of layers is activated, colors of all cells are displayed in each of the plurality of cells, and if activation gets carried out toward a low layer, colors are eliminated from a most outer cell.

18. The method as claimed in claim 11, wherein the plurality of images included in the indicator have numbers that equally correspond to the numbers of the plurality of layers, the plurality of images have different sizes and different colors from each other and are displayed overlapping in an same order to an order of layers, and if one layer is activated, an image which corresponds to the activated layer may be displayed on a highest position.

19. The method as claimed in claim 11, wherein the plurality of images included in the indicator have numbers that equally correspond to the numbers of the plurality of layers, and the plurality of images are arranged in an same order to an order of layers on the screen, and wherein among the plurality of images, display state of at least one image corresponding to a currently activated layer is changed in order to be differentiated from remaining images.

20. The method as claimed in claim 19, further comprising: changing into a layer which corresponds to a selected image if one image among the plurality of images is selected.

* * * * *